United States Patent
Otenko

(10) Patent No.: US 9,588,733 B2
(45) Date of Patent: Mar. 7, 2017

(54) SYSTEM AND METHOD FOR SUPPORTING A LAZY SORTING PRIORITY QUEUE IN A COMPUTING ENVIRONMENT

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 426 days.

(21) Appl. No.: 14/167,792

(22) Filed: Jan. 29, 2014

(65) Prior Publication Data

US 2015/0212794 A1 Jul. 30, 2015

(51) Int. Cl.
| | | |
|---|---|---|
| *G06F 13/20* | (2006.01) | |
| *G06F 5/06* | (2006.01) | |
| *G06F 9/52* | (2006.01) | |
| *G06F 9/54* | (2006.01) | |
| *G06F 13/22* | (2006.01) | |

(52) U.S. Cl.
CPC .............. *G06F 5/065* (2013.01); *G06F 9/52* (2013.01); *G06F 9/546* (2013.01); *G06F 13/22* (2013.01); *G06F 2205/067* (2013.01); *G06F 2209/548* (2013.01); *G06F 2213/2806* (2013.01)

(58) Field of Classification Search
CPC ..................................................... G06F 9/4881
See application file for complete search history.

(56) References Cited

U.S. PATENT DOCUMENTS

| | | |
|---|---|---|
| 5,109,384 A | 4/1992 | Tseung |
| 6,449,614 B1 | 9/2002 | Marcotte |
| 6,874,144 B1 | 3/2005 | Kush |
| 6,895,590 B2 | 5/2005 | Yadav |
| 6,938,085 B1 | 8/2005 | Belkin et al. |
| 7,046,676 B2 | 5/2006 | Goetzinger et al. |
| 7,554,993 B2 | 6/2009 | Modi et al. |
| 7,685,391 B1 | 3/2010 | Cholleti et al. |
| 7,761,617 B2 | 7/2010 | Seigneret et al. |

(Continued)

FOREIGN PATENT DOCUMENTS

WO 2012084835 6/2012

OTHER PUBLICATIONS

Baldwin, Richard G., "The ByteBuffer Class in Java", Aug. 20, 2012, 14 pages. Retrieved from : <http://www.developer.com/author/Richard-G.-Baldwin-64720.htm>.

(Continued)

*Primary Examiner* — Henry Tsai
*Assistant Examiner* — Juanito Borromeo
(74) *Attorney, Agent, or Firm* — Tucker Ellis LLP

(57) ABSTRACT

A system and method can support queue processing in a computing environment. A lazy sorting priority queue in a concurrent system can include a priority queue and one or more buffers. The one or more buffers, which can be first-in first-out (FIFO) buffers, operate to store one or more requests received from one or more producers, and move at least one message to the priority queue when no consumer is waiting for processing a request. Furthermore, the priority queue operates to prioritize one or more incoming requests received from the one or more buffers, and allows one or more consumers to pick up the requests based on priority.

20 Claims, 7 Drawing Sheets

(56) References Cited

U.S. PATENT DOCUMENTS

| | | | |
|---|---|---|---|
| 7,876,677 B2* | 1/2011 | Cheshire | H04L 12/5693 370/230.1 |
| 7,991,904 B2 | 8/2011 | Melnyk et al. | |
| 8,130,776 B1 | 3/2012 | Sundararajan | |
| 8,131,860 B1 | 3/2012 | Wong et al. | |
| 8,255,914 B1 | 8/2012 | Joyce et al. | |
| 8,347,302 B1 | 1/2013 | Vincent et al. | |
| 8,504,691 B1 | 8/2013 | Tobler et al. | |
| 8,539,486 B2 | 9/2013 | Cain et al. | |
| 8,578,033 B2 | 11/2013 | Mallart | |
| 8,850,441 B2 | 9/2014 | Allen | |
| 8,863,136 B2 | 10/2014 | Allen | |
| 8,918,791 B1 | 12/2014 | Chudgar et al. | |
| 8,930,584 B2 | 1/2015 | Otenko et al. | |
| 2001/0034753 A1 | 10/2001 | Hildebrand | |
| 2002/0114338 A1 | 8/2002 | Craig | |
| 2002/0143847 A1 | 10/2002 | Smith | |
| 2002/0174136 A1 | 11/2002 | Cameron et al. | |
| 2003/0014480 A1 | 1/2003 | Pullara et al. | |
| 2003/0053469 A1 | 3/2003 | Wentink | |
| 2003/0078958 A1 | 4/2003 | Pace et al. | |
| 2003/0110232 A1 | 6/2003 | Chen | |
| 2003/0120822 A1 | 6/2003 | Langrind et al. | |
| 2004/0177126 A1 | 9/2004 | Maine | |
| 2004/0205771 A1 | 10/2004 | Sudarshan et al. | |
| 2005/0021354 A1 | 1/2005 | Brendle et al. | |
| 2005/0038801 A1 | 2/2005 | Colrain et al. | |
| 2005/0094577 A1 | 5/2005 | Ashwood-Smith | |
| 2005/0102412 A1 | 5/2005 | Hirsimaki | |
| 2005/0262215 A1 | 11/2005 | Kirov et al. | |
| 2005/0283577 A1 | 12/2005 | Sivaram et al. | |
| 2006/0015600 A1 | 1/2006 | Piper | |
| 2006/0015700 A1 | 1/2006 | Burka | |
| 2006/0031846 A1 | 2/2006 | Jacobs et al. | |
| 2006/0143525 A1 | 6/2006 | Kilian | |
| 2006/0176884 A1 | 8/2006 | Fair | |
| 2006/0209899 A1 | 9/2006 | Cucchi et al. | |
| 2006/0230411 A1 | 10/2006 | Richter et al. | |
| 2006/0294417 A1 | 12/2006 | Awasthi et al. | |
| 2007/0118601 A1 | 5/2007 | Pacheco | |
| 2007/0156869 A1 | 7/2007 | Galchev et al. | |
| 2007/0198684 A1 | 8/2007 | Mizushima | |
| 2007/0203944 A1 | 8/2007 | Batra et al. | |
| 2007/0263650 A1 | 11/2007 | Subramania et al. | |
| 2008/0044141 A1 | 2/2008 | Willis et al. | |
| 2008/0098458 A2 | 4/2008 | Smith | |
| 2008/0140844 A1 | 6/2008 | Halpern | |
| 2008/0286741 A1 | 11/2008 | Call | |
| 2009/0034537 A1 | 2/2009 | Colrain et al. | |
| 2009/0150647 A1 | 6/2009 | Mejdrich et al. | |
| 2009/0172636 A1 | 7/2009 | Griffith | |
| 2009/0182642 A1 | 7/2009 | Sundaresan | |
| 2009/0327471 A1 | 12/2009 | Astete et al. | |
| 2010/0082855 A1* | 4/2010 | Accapadi | G06F 13/364 710/39 |
| 2010/0100889 A1 | 4/2010 | Labrie et al. | |
| 2010/0198920 A1 | 8/2010 | Wong et al. | |
| 2010/0199259 A1 | 8/2010 | Quinn | |
| 2010/0278190 A1 | 11/2010 | Yip et al. | |
| 2011/0029812 A1 | 2/2011 | Lu et al. | |
| 2011/0055510 A1 | 3/2011 | Fritz et al. | |
| 2011/0071981 A1 | 3/2011 | Ghosh et al. | |
| 2011/0119673 A1 | 5/2011 | Bloch et al. | |
| 2011/0153992 A1 | 6/2011 | Srinivas et al. | |
| 2011/0161457 A1 | 6/2011 | Sentinelli | |
| 2011/0231702 A1 | 9/2011 | Allen et al. | |
| 2012/0023557 A1 | 1/2012 | Bevan | |
| 2012/0054472 A1 | 3/2012 | Altman et al. | |
| 2012/0066400 A1 | 3/2012 | Reynolds | |
| 2012/0066460 A1 | 3/2012 | Bihani | |
| 2012/0158684 A1 | 6/2012 | Lowenstein et al. | |
| 2012/0218891 A1 | 8/2012 | Sundararajan | |
| 2012/0239730 A1 | 9/2012 | Revanuru | |
| 2013/0004002 A1 | 1/2013 | Duchscher | |
| 2013/0132970 A1 | 5/2013 | Miyoshi | |
| 2013/0145373 A1 | 6/2013 | Noro | |
| 2013/0304848 A1 | 11/2013 | Lyle et al. | |

OTHER PUBLICATIONS

European Patent Office, International Searching Authority, International Search Report and Written Opinion dated Mar. 6, 2014 for International Application No. PCT/US2013/067106, 11 pages.
United States Patent and Trademark Office, Office Action Dated May 9, 2016 for U.S. Appl. No. 13/781,500, 14 pages.
United States Patent and Trademark Office, Office Action Dated Dec. 16, 2016 for U.S. Appl. No. 13/781,500, 15 Pages.

* cited by examiner

SYSTEM AND METHOD FOR SUPPORTING A LAZY SORTING PRIORITY QUEUE IN A COMPUTING ENVIRONMENT

CROSS REFERENCE TO RELATED APPLICATIONS

This application is related to the following patent applications, each of which is hereby incorporated by reference in its entirety:

U.S. Patent Application titled "SYSTEM AND METHOD FOR SUPPORTING COOPERATIVE CONCURRENCY IN A MIDDLEWARE MACHINE ENVIRONMENT", Application Ser. No. 13/781,475, filed on Feb. 28, 2013, now U.S. Pat. No. 9,378,045;

U.S. Patent Application titled "SYSTEM AND METHOD FOR USING A SEQUENCER IN A CONCURRENT PRIORITY QUEUE", Application Ser. No. 13/781,493, filed on Feb. 28, 2013, now U.S. Pat. No. 9,110,715;

U.S. Patent Application titled "SYSTEM AND METHOD FOR TRANSFORMING A QUEUE FROM NON-BLOCKING TO BLOCKING", Application Ser. No. 13/781,500, filed on Feb. 28, 2013; and U.S. Patent Application titled "MULTI-LANE CONCURRENT BAG FOR FACILITATING INTER-THREAD COMMUNICATION", Application Ser. No. 13/241,015, filed Sep. 22, 2011, now U.S. Pat. No. 8,689,237, issued Apr. 1, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to queue processing in a computing environment.

BACKGROUND

Within any large organization, over the span of many years, the organization often finds itself with a sprawling IT infrastructure that encompasses a variety of different computer hardware, operating systems, and application software. Although each individual component of such infrastructure might itself be well-engineered and well-maintained, when attempts are made to interconnect such components, or to share common resources, it is often a difficult administrative task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Described herein are systems and methods that can support queue processing in a computing environment. A lazy sorting priority queue in a concurrent system can include a priority queue and one or more buffers. The one or more buffers, which can be first-in first-out (FIFO) buffers, operate to store one or more requests received from one or more producers, and move at least one message to the priority queue when no consumer is waiting for processing a request. Furthermore, the priority queue operates to prioritize one or more incoming requests received from the one or more buffers, and allows one or more consumers to pick up the requests based on priority.

DETAILED DESCRIPTION

Described herein are systems and methods that can support queue processing in a computing environment.

Lazy Sorting Priority Queue

Priority queues can be used for prioritizing the elements in a concurrent system, which may be received in a total order, based on different application-specific criteria. For example, the priority queues can be used to prioritize service requests that are received at a messaging system, and to re-arrange these enqueued service requests into a different order.

Furthermore, the performance of the priority queue may contribute significantly toward the overall performance of the concurrent system, even though the priority queue can be designed and implemented using different approaches. For example, the prioritization of the enqueued elements within a priority queue may require a complete sorting of all the enqueued elements, which is an operation with at least O(log) complexity. Additionally, the system may need to use a complex data structure for maintaining the various requests in a prioritized order in a concurrent priority queue.

In accordance with an embodiment of the invention, the system can reduce the overhead (e.g. from sorting) by taking into account contention pressure from various consumers that are ready to dequeue the requests.

Figure 1:
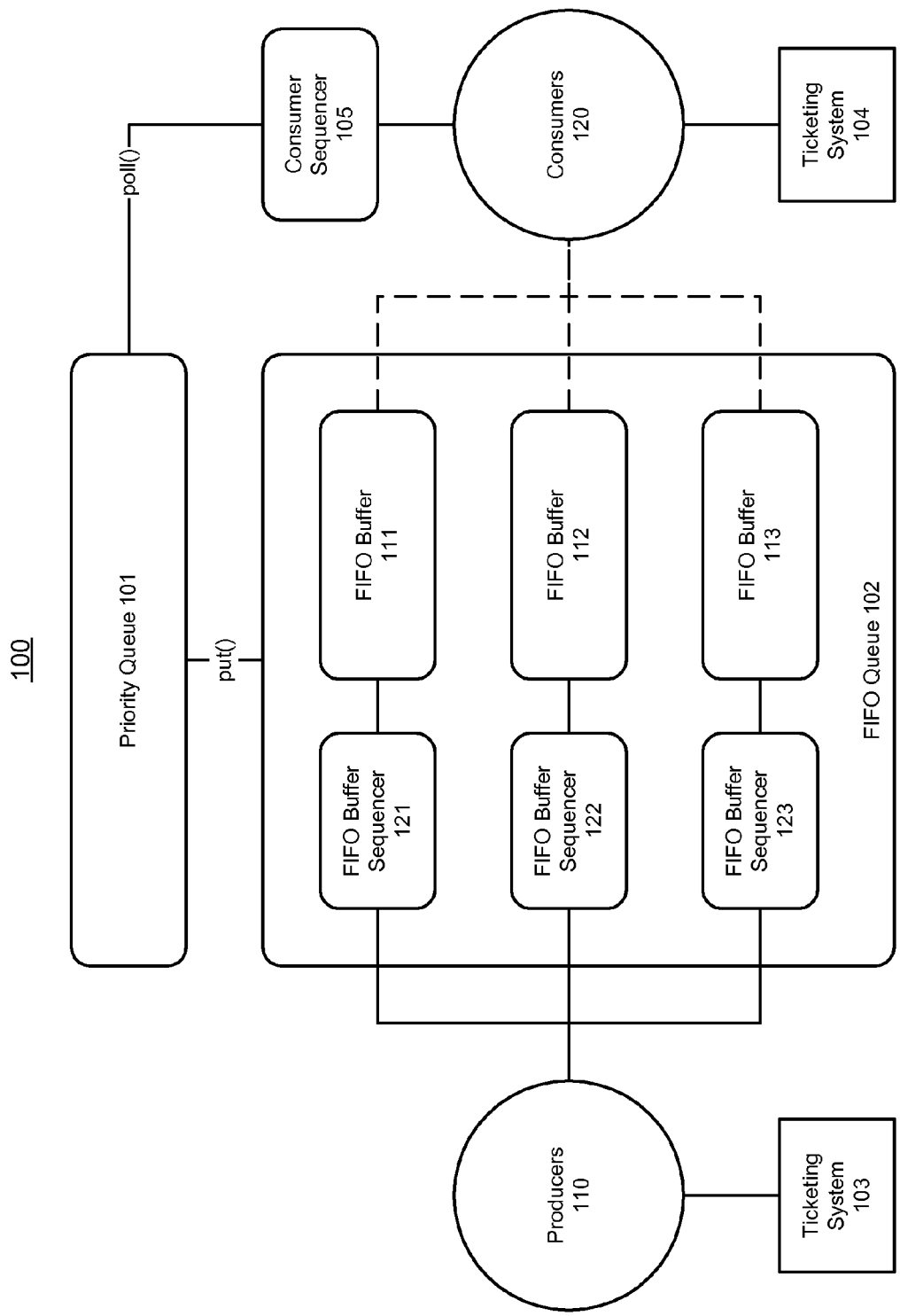
FIG. 1 shows an illustration of supporting efficient queue processing in a computing environment, in accordance with an embodiment of the invention.

FIG. 1 shows an illustration of supporting efficient queue processing in a computing environment, in accordance with an embodiment of the invention. As shown in FIG. 1, the computing environment 100 includes a priority queue 101 and one or more buffers, such as one or more first-in first-out (FIFO) buffers 111-113 in a FIFO queue 102. Here, multiple FIFO buffers 111-113 can be arranged orthogonally in order to reduce the CPU cache contention.

In accordance with an embodiment of the invention, multiple producers 110 and multiple consumers 120 can access the priority queue 101 and the FIFO queue 102 concurrently. For example, the producers 110 can be muxer threads unmarshalling requests from network connections, and the consumers 120 can be worker threads picking up requests from the priority queue 101.

When the contention level is low in the system, the underlying priority queue 101 can sort the requests waiting in the priority queue 101 (with a logarithmic cost) in order to ensure that the request with the highest priority in the priority queue 101 can have the shortest waiting time. Thus, when the next consumer 120, or worker thread, is allowed to pick up a unit of work, it can pick up the unit with the highest priority. Here, the consumers 120, or the worker threads, may take arbitrary time to process the requests, and the requests in the priority queue 101 may be considered waiting only after the last consumer 120 leaves the dequeue entry point.

Additionally, the consumer 120 can retrieve a request from the priority queue 101 by calling a poll( )method. As shown in FIG. 1, the consumers 120 can use a ticketing system 104 and a consumer sequencer 105 in order to ensure that only one working thread is accessing the priority queue 101 at any given time. For example, the ticketing system 104 can be implemented using an atomic ticketing system.

Also, a producer 110 can place an element in the FIFO queue first. As shown in FIG. 1, the producers 110 can use a separate ticketing system 103, which can also be an atomic ticketing system, and employ one or more buffer sequencers, such as the FIFO buffer sequencers 121-123 for the FIFO buffers 111-113.

In accordance with an embodiment of the invention, the system allows the producer 110 to select a FIFO buffer from the FIFO queue 102. Furthermore, the system allows the request to be moved from a selected FIFO buffer 111-113 to the priority queue using a put( )method call.

Here, due to the need for sorting the elements in the priority queue 101, an operation based on ether the put( )method or the poll( )method may have a logarithmic cost. Thus, the system can reduce the cost for sorting the elements in a priority queue by reducing the number of calls to these methods under contention.

In order to improve the efficiency of the concurrent system, both the producer 110 and the consumer 120 may attempt to move one or more elements to the priority queue 101, when no consumer is waiting for processing a request in the priority queue 101 (i.e. when there is no contention).

On the other hand, when the contention level is high, i.e. when one or more consumers 120 are ready to extract units of work from the priority queue 101, the priority of the requests waiting in the priority queue 101 to be processed may be higher than the priority of the requests after they are picked up. Thus, the system allows the producers 110 to be blocked when attempting to add one or more elements to the priority queue 101, and allows the elements to remain unsorted in the FIFO queue 102, as long as there are consumers contending for the sequencer.

Subsequently, the units of work can be moved from the FIFO queue 102 to the priority queue 101, a later time when a future producer and/or a future consumer finds no contention, or until the units of work can be extracted by consumers 120 in the FIFO order, if the contention remains high.

Figure 2:
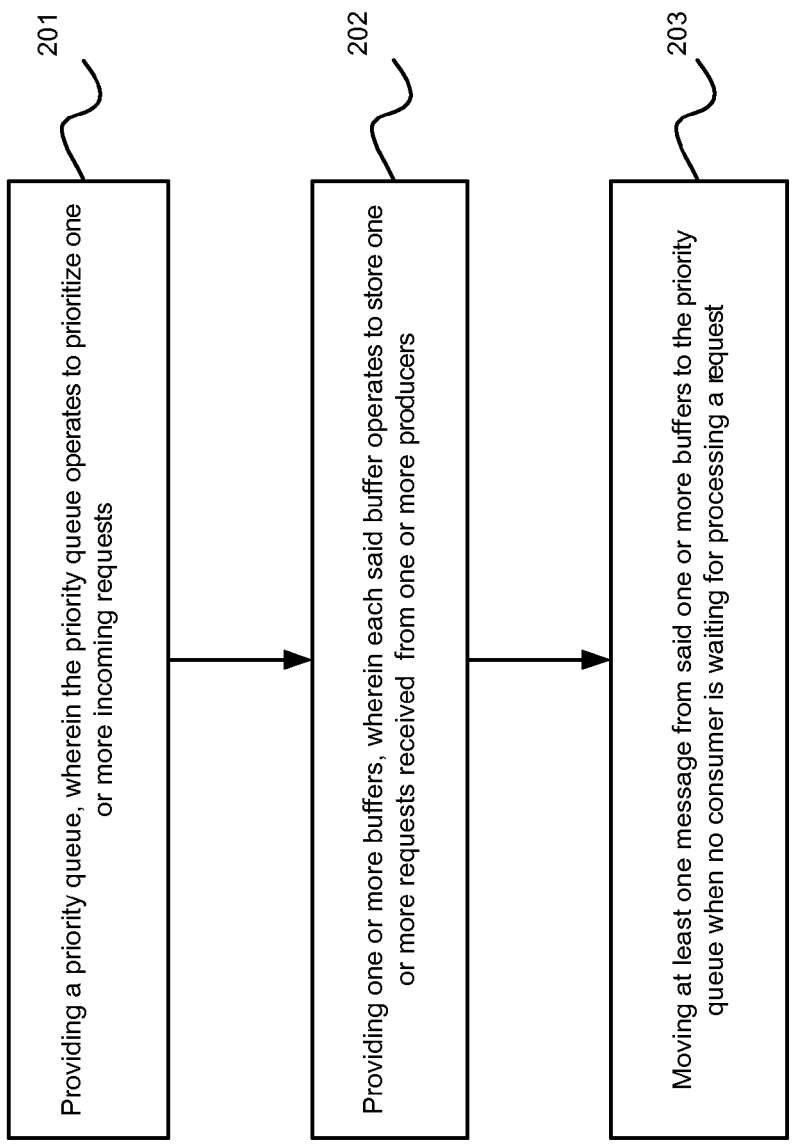
FIG. 2 illustrates an exemplary flow chart for supporting queue processing in a computing environment, in accordance with an embodiment of the invention.

FIG. 2 illustrates an exemplary flow chart for supporting queue processing in a computing environment, in accordance with an embodiment of the invention. As shown in FIG. 2, at step 201, the system can provide a priority queue, wherein the priority queue operates to prioritize one or more incoming requests. Furthermore, at step 202, the system can provide one or more buffers, wherein each said buffer operates to store one or more requests received from one or more producers. Additionally, at step 203, the system can move at least one message from said one or more buffers to the priority queue when no consumer is waiting for processing a request.

Concurrent Thread Operations

Figure 3:
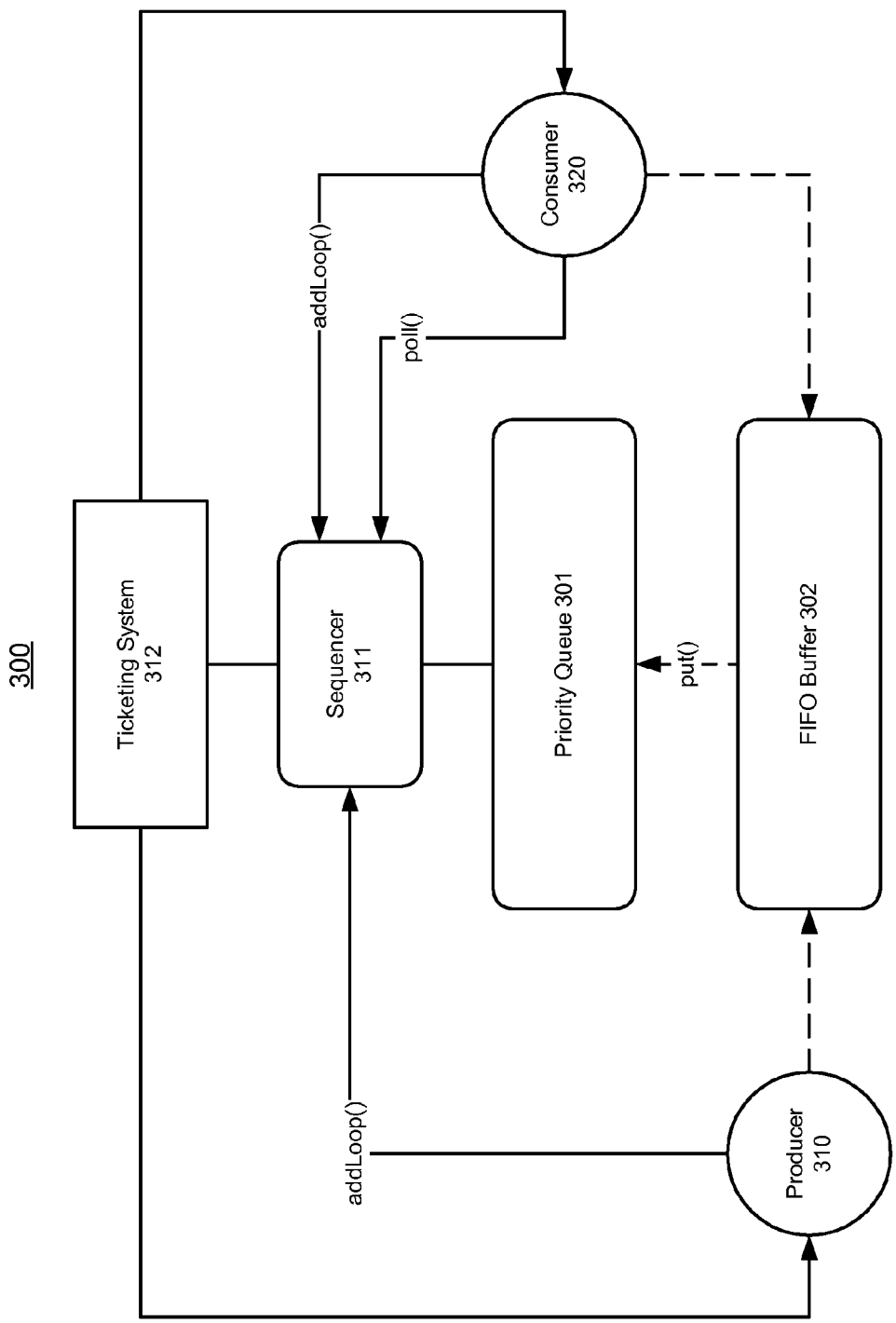
FIG. 3 shows an illustration of supporting concurrent thread operations in a lazy sorting priority queue, in accordance with an embodiment of the invention.

FIG. 3 shows an illustration of supporting concurrent thread operations in a lazy sorting priority queue, in accordance with an embodiment of the invention. As shown in FIG. 3, a lazy sorting priority queue 300, which is a concurrent system, can include a priority queue 301 and a FIFO buffer 302.

Furthermore, a producer 310 can place a request in the FIFO buffer 302. Then, the request can be moved to the priority queue 301 using a put( )method call. Additionally, a consumer 320 can place a poll( )method call to retrieve a request from the priority queue 301. In order to improve the efficiency of the concurrent system 300, each of the producer 310 and consumer 320 may attempt to move one or more elements from the FIFO buffer 302 to the priority queue 301, e.g. by calling an addLoop( )method.

As shown in FIG. 3, in order to guarantee a single-threaded access to the underlying priority queue 301, the ticketing system 312 and sequencer 311 can be used by both the producer 310 and the consumer 320 in calling the addLoop( )method. Additionally, the consumer 320 can use the same ticketing system 312 and sequencer 311 in calling the poll( )method.

In other words, the sequencer 311 permits a thread (either the producer 310 or the consumer 320) to have an exclusive access to the priority queue 301, when there are no threads calling the poll( )method and the addLoop( )method. Then, the thread can move one or more elements from the FIFO buffer 302 to the priority queue 301, e.g. using a priority-Queue.put( )method call.

In accordance with an embodiment of the invention, the system ensures that the elements (or units of work) can be moved lazily, or opportunistically, when there is no contention from the consumers 320. On the other hand, the consumers 320 can take precedence once they arrive, and the consumers 320 are allowed to extract elements from the FIFO buffer 302 without having all known requests sorted.

Thus, the concurrent system can behave similarly to a priority queue 301 with a lock biased towards the consumers 320. The system makes sure that the priority queue 301 is short and the cost of adding and removing elements from the priority queue 301 is minimized. For example, at high contention levels, the priority queue 301 becomes completely empty, while the requests in the concurrent system 300 may be processed in the FIFO order.

Figure 4:
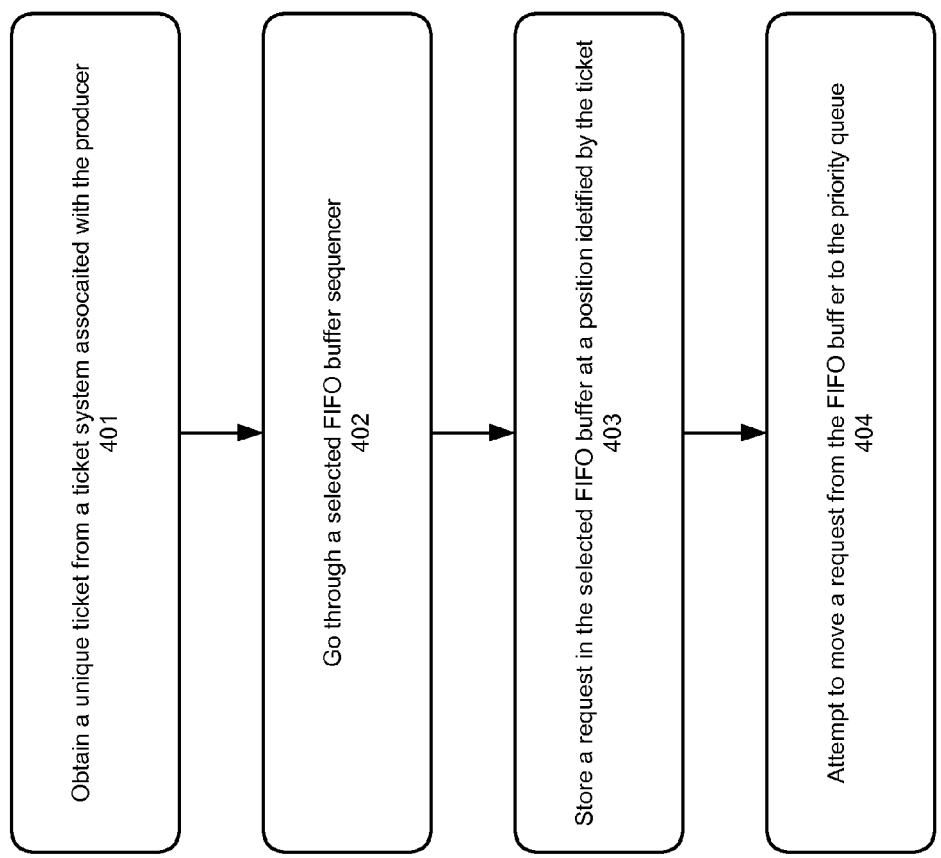
FIG. 4 shows an illustration of performing an enqueue operation by a producer in a computing environment, in accordance with an embodiment of the invention.

FIG. 4 shows an illustration of performing an enqueue operation 400 by a producer in a computing environment, in accordance with an embodiment of the invention. As shown in FIG. 4, at step 401, the producer can obtain a unique ticket from a ticketing system that is associated with the producer. Then, at step 402, the producer can go through a selected FIFO buffer sequencer. Furthermore, at step 403, the producer can store request in FIFO buffer at position identified by the ticket. This step can be highly concurrent, since multiple producers (e.g. up to the buffersize of producers) can proceed to store requests concurrently. Finally, at step 404, the producer may attempt to move a request from the FIFO buffer to the priority queue, e.g. by calling an add Loop( )function.

Figure 5:
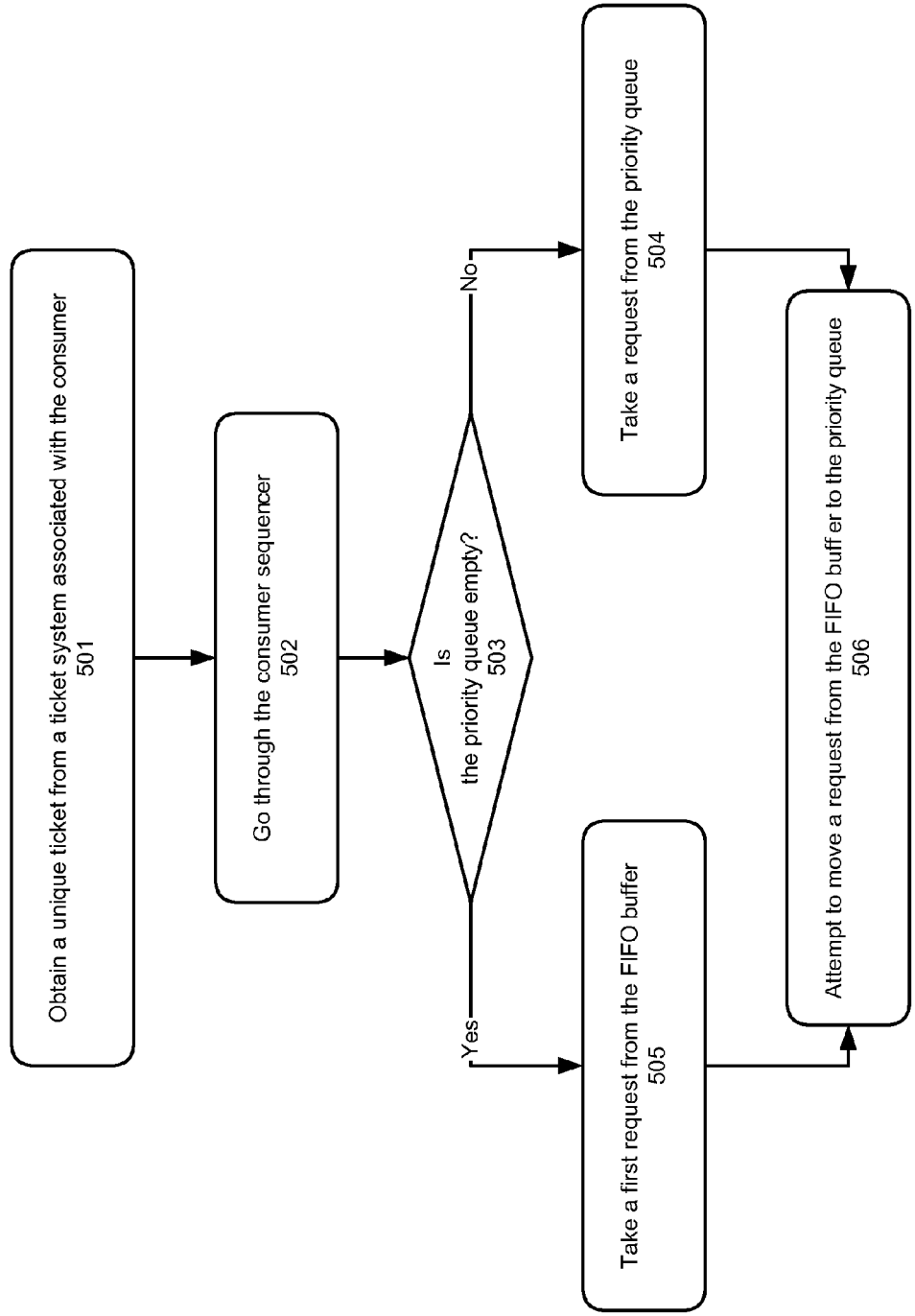
FIG. 5 shows an illustration of performing a dequeue operation by a consumer in a computing environment, in accordance with an embodiment of the invention.

FIG. 5 shows an illustration of performing a dequeue operation 500 by a consumer in a computing environment, in accordance with an embodiment of the invention. As shown in FIG. 5, at step 501, the consumer can call a poll( )method and obtains a unique ticket from a ticketing system associated with the consumer. Then, at step 502, the consumer can go through the consumer sequencer. Furthermore, at step 503, the consumer can determine whether the priority queue is empty. For example, at step 504, the consumer can take one request from the priority queue, when the priority queue is not empty. Otherwise, at step 505, the consumer can take the first request from FIFO buffer when the priority queue is empty. This guarantees high throughput of the priority queue, since there may not be enough time to sort the requests. Finally, at step 506, the consumer may attempt to move a request from the FIFO buffer to the priority queue, e.g. by calling an add Loop( )function.

Figure 6:
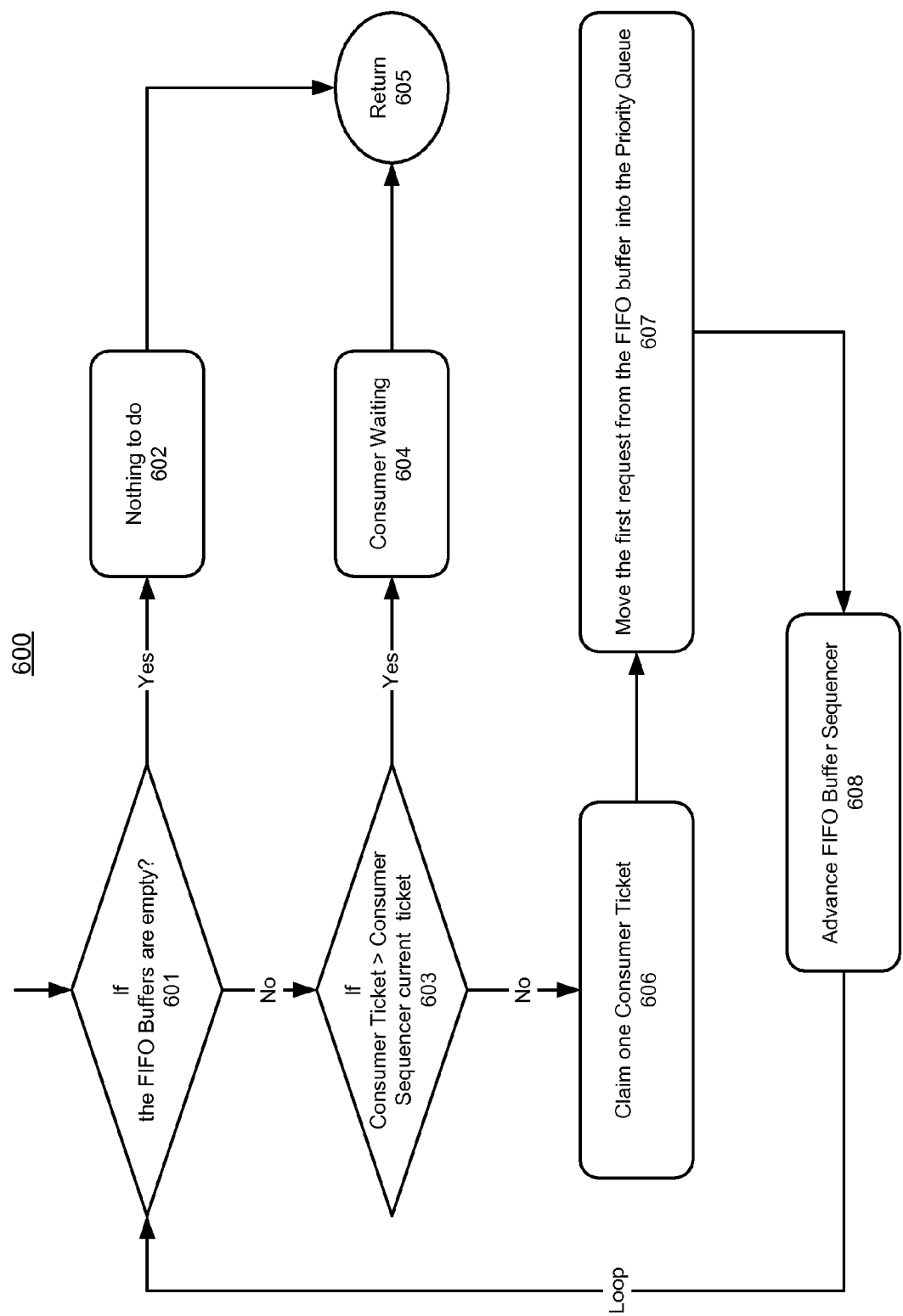
FIG. 6 shows an illustration of performing an operation to move an element from a FIFO buffer to a priority queue, in accordance with an embodiment of the invention.

FIG. 6 shows an illustration of performing an operation 600 to move an element from a FIFO buffer to a priority queue, in accordance with an embodiment of the invention. As shown in FIG. 6, the operation to move an element from a FIFO buffer to a priority queue e.g. an addloop( ) method call, can be implemented using a loop.

At step 601, which is at the beginning of each iteration in the loop, the thread can check whether the FIFO buffers are empty. If the FIFO buffers are empty, at step 602, the system determines that the thread has nothing to do. Accordingly, at step 605, the thread returns and terminates the loop. On the other hand, at step 603, if the FIFO buffers are not empty, the thread can check whether there are consumers waiting, e.g. by checking the state of the consumer sequencer and the consumer ticketing system (i.e., if acquired consumer ticket>consumer sequencer current ticket).

At step 604, the system can determine that there are consumers waiting. Accordingly, at step 605, the thread returns and terminates the loop. This guarantees that producers step out of the way under high contention. In effect, the queue lock is biased towards consumers, which permits the complex structure of priority queue to be emptied quickly and permits the subsequent add operations to be performed quickly or to be completely eliminated.

Then, at step 606, the thread can claim one consumer ticket. This is made possible only if no consumers have arrived and are ready to perform dequeue operations. Furthermore, at step 607, the thread can move the first request from the FIFO buffer into the priority queue, which may have amortized logarithmic cost.

Finally, at step 608, the thread can advance the FIFO buffer sequencer, which allows the concurrent producers to reuse the emptied buffer cell, before finishing the iteration in the loop and proceeding to the next iteration by returning to step 601.

An Exemplary Implementation

Figure 7:
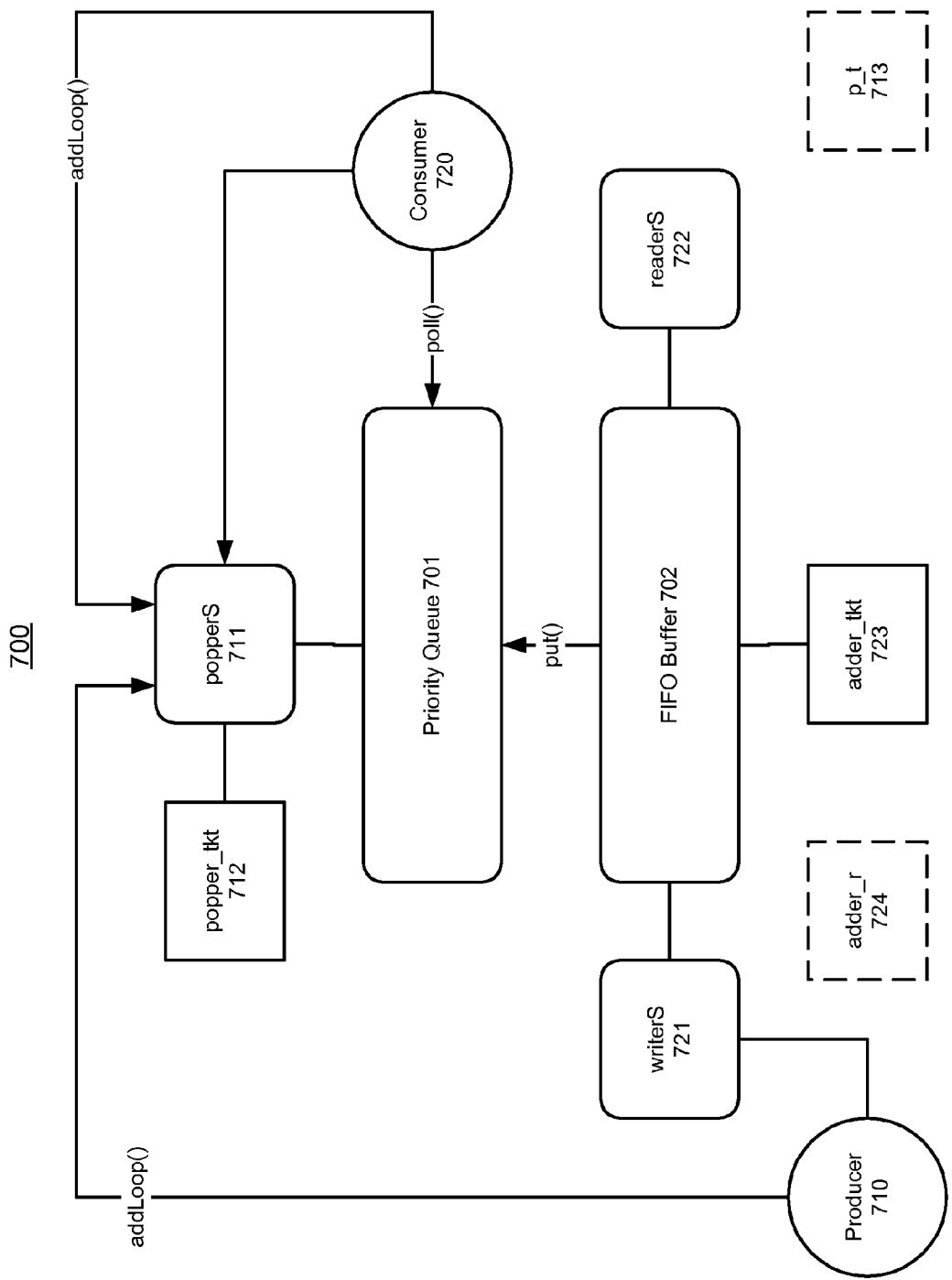
FIG. 7 shows an illustration of an exemplary lazy sorting priority queue, in accordance with an embodiment of the invention.

FIG. 7 shows an illustration of an exemplary lazy sorting priority queue, in accordance with an embodiment of the invention. As shown in FIG. 7, the exemplary lazy sorting priority queue 700 can include a priority queue 701 and a FIFO buffer 702.

For example, the FIFO buffer 702 can be implemented using an array of Objects, q, and two sequencers, such as a readerS sequencer 722 and a writerS sequencer 721. Additionally, the priority queue 701 can be supported using a popperS sequencer 711.

As shown in FIG. 7, the producer 710 can place an element in the FIFO buffer 702 by atomically acquiring a ticket, adder_r 724, from the ticketing system, adder_tkt 723. Then, the producer 710 can wait on the writerS sequencer 721 for storing the element at a particular index in the array. Afterwards, the producer 710 can permit the progress of any thread attempting to read the same array cell by advancing the readerS sequencer 722. Furthermore, the producer 710 can attempt to move one or more elements to the priority queue 701.

Additionally, the consumer 720 can acquire a ticket, p_t 713, from the ticketing system, popper_tkt 712, e.g. using an atomic increment popper_tkt.getAndIncrement( )method call, and await on the popperS sequencer 711, e.g. via the popperS.await( )function call. Then, after removing an element from the priority queue 701 or the FIFO buffer 702, the consumer 720 may attempt to move one or more elements from the FIFO buffer 702 to the Priority Queue 701.

As shown in FIG. 7, both the producer 710 and the consumer 720 can call an addLoop( )method in order to move one or more elements from the FIFO queue 702 to the Priority Queue 701.

First, a thread, either the producer 710 or the consumer 720, can check whether the popperS sequencer 711 permits the thread to move one or more elements from the FIFO buffer 702 to the priority queue 701. For example, the thread can compare the value of the acquired ticket, p_t 713, with the value of the current ticket, popper_tkt 712.

Here, the popperS sequencer 711 may only allow a thread to move one or more elements from the FIFO buffer 702 to the priority queue 701, when there are no threads calling the poll( )method and the add Loop( )method. Additionally, the last thread that exits these methods can advance the popperS sequencer 711.

Otherwise, the thread, which corresponds to the current ticket, popper_tkt 712, is behind an existing thread in a poll( )method or an addLoop( )method. In such a case, there is no need to move elements from the FIFO buffer 702 to the priority queue 701, since doing so may either interfere with a consumer 720 extracting an element, or interfere with a thread that has already started moving elements from the FIFO buffer 702 to the priority queue 701.

Accordingly, the popperS sequencer 711 may not allow a thread to move one or more elements from the FIFO buffer 702 to the priority queue 701, when there is contention (i.e. when one or more consumers 720 are ready to extract units of work from the priority queue 701). Thus, the units of work in the FIFO buffer 702 can remain unsorted until a later thread, either a producer 710 or a consumer 720, finds a suitable time with no contention, or until the units of work are extracted by the consumers 720, if the contention remains high.

Furthermore, if popperS sequencer 711 permits progress for the current ticket, popper_tkt 712, the thread may attempt to atomically acquire this ticket, e.g. using a popper_tkt.compareAndSet(p_t, p_t+1) function call. This may succeed only if there is no thread attempting to acquire the same ticket in a concurrent call to poll( )or addLoop( )

On the other hand, when there are one or more concurrent threads, the system can guarantee that only one of the concurrent threads can successfully acquire the ticket. For example, this guarantee can be implemented via the atomic compareAndSet operation and the atomic getAndIncrement operation used by the addLoop( )method call and the poll( )ethod call, respectively. Thus, if the thread in a addLoop( )method call fails to acquire the ticket, there is no need to move elements, since, otherwise, the thread may either interfere with a consumer 720 extracting an element, or interfere with a thread that has already been moving elements from the FIFO buffer 702 to the priority queue 701.

In accordance with an embodiment of the invention, after successfully acquiring the ticket, the thread can execute a loop, in which the thread can move one unit of work at a time from the FIFO queue 702 to the priority queue 701. For example, since the thread can have exclusive access to the priority queue 701 (e.g. having progressed past popperS.await( )method call with a successfully acquired ticket), the thread can add the removed element to priority queue 701 using a priorityQueue.put( )method call.

Then, the thread can proceed to the next iteration of the loop. The loop continues until one or more consumers arrives at poll( )and waits to extract elements from the queue. The loop also terminates as soon as the FIFO buffer 702 becomes empty. After the loop terminates, the thread can advance the popperS sequencer 711 to permit the consumer 720 who has been waiting, or a future consumer 720, to proceed past popperS.await( )

Additionally, at the end of each iteration (or at the beginning of the next iteration), the thread can monitor the state of the ticketing system, popper_tkt 711, to detect a contender. The contender may only be a customer thread 720 in a poll( )method call, which can acquire a ticket unconditionally. Here, the thread entering the addLoop( )method call may detect that popperS sequencer 711 does not permit progress, and decide to exit without attempting to acquire a ticket.

For example, the detection of contention can be done by comparing the value of a successfully acquired ticket, p_t 713, with the value of a current ticket, popper_tkt 712. If popper_tkt >p_t, then the other thread must have incremented the current ticket, popper_tkt 711. Furthermore, the other thread can be waiting for proceeding past popperS.await( ) which is a blocking call to popperS sequencer 711 that force the other thread to wait until the ticket acquired by the thread is permitted to proceed. On the other hand, if popper_tkt=p_t, then no contenders have arrived, and the thread can move one unit of work fro FIFO queue 702 into priority queue 701 if FIFO queue 702 is not empty.

Here, in order to determine whether the FIFO queue 702 is empty, the thread can compare the acquired ticket, adder_r 724, with the current ticket, adder_tkt 723. If adder_tkt adder_r, then the FIFO queue must be empty. Otherwise, the FIFO queue 702 is not empty when adder_tkt>adder_r. Thus, the thread can move one element from the FIFO buffer 702 to the priority queue 701.

Furthermore, the thread can wait on the readerS sequencer 722, e.g. using a readerS.await(adder_r) method call. Then, the thread can proceed to work out the index of the array for the unit of work that is corresponding to the adder_r ticket 724. Additionally, the thread can advance the writers sequencer 721, e.g. using releaseWriters(adder_r), in order to permit concurrent producers 710 to use the array cell that was recently emptied.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting queue processing in a computing environment, the system comprising:
   a processor;
   a priority queue operable to store a set of priority service requests and to prioritize the set of priority service requests as a set of prioritized service requests stored in the priority queue, wherein the set of prioritized service requests are available to an associated consumer in operative communication with the system for processing by the associated consumer;
   one or more buffers, wherein each of the one or more buffers is operable to store one or more service requests received from an associated producer in operative communication with the system; and
   a thread executable to determine a lack of associated consumers waiting for processing the set of prioritized service requests, and to selectively move a service request of the one or more service requests stored in the one or more buffers to the priority queue as a priority service request exclusively in response to the determining the lack of associated consumers waiting for processing the set of prioritized service requests.

2. The system according to claim 1, wherein:
   each of said one or more buffers is configured to allow the associated consumer to process said one or more service requests in a first-in first-out (FIFO) order.

3. The system according to claim 1, wherein:
   the thread is responsive to the associated producer to:
      obtain a unique ticket from a ticketinq system associate with the producer,
      go through a buffer sequencer that is associated with a selected buffer selected from said one or more buffers, and
      store a service request in the selected buffer at a position identified by the unique ticket.

4. The system according to claim 3, wherein:
   the thread is responsive to a plurality of associated producers to store multiple service requests in the selected buffer concurrently.

5. The system according to claim 1, wherein:
the thread is responsive to the associated consumer to:
obtain a unique ticket from a ticketing system associated with the consumer,
go through a consumer sequencer, and
take i) a priority service request from the priority queue or ii) a service request from said one or more buffers.

6. The system according to claim 5, wherein:
the thread is responsive to the associated consumer to:
retrieve a priority service request from the priority queue responsive to the priority queue being not empty, or
retrieve a first service request from said one or more buffers responsive to the priority queue being empty.

7. The system according to claim 5, wherein:
the thread is operable to check both the consumer sequencer and the ticketing system associated with the consumer.

8. The system according to claim 7, wherein:
the thread is operable to return when there is at least one associated consumer waiting for processing the set of prioritized service requests.

9. The system according to claim 1, wherein:
the thread is operable to maintain the priority queue short to allow for lower complexity in performing an enqueing operation at the priority queue.

10. The system according to claim 9, wherein the thread is operable to:
permit the priority queue to become empty when one or more associated consumers are waiting for processing the set of prioritized service requests, and to process the one or more service requests of the one or more buffers in a first-in first-out (FIFO) order.

11. A method for supporting queue processing in a computing environment, the method comprising:
providing a priority queue wherein the priority queue operable to store a set of priority service requests and to prioritize the set of priority service requests as a set of prioritized service requests stored in the priority queue, wherein the set of prioritized service requests are available to an associated consumer in operative communication with the system for processing by the associated consumer;
providing one or more buffers, wherein each of the one or more buffers is operable to store one or more service requests received from an associated producer in operative communication with the system; and
providing a thread executable to determine a lack of associated consumers waiting for processing the set of prioritized service requests, and the thread being executable to selectively move a service request of the one or more service requests stored in the one or more buffers to the priority queue as a priority service request exclusively in response to the determining the lack of associated consumers waiting for processing the set of prioritized service requests.

12. The method of claim 11, further comprising:
allowing the associated producer to process said one or more service requests in a first-in first-out (FIFO) order.

13. The method according to claim 11, further comprising:
obtaining, via the thread responsive to the associated producer, a unique ticket from a ticketinq system associate with the producer,
going via the thread through a buffer sequencer that is associated with a selected buffer selected from said one or more buffers, and
storing via the thread a service request in the selected buffer at a position identified by the unique ticket.

14. The method according to claim 13, further comprising:
allowing via the thread responsive to the associated producer a plurality of associated producers to store multiple service requests in the selected buffer concurrently.

15. The method according to claim 11, further comprising:
obtaining, via the thread responsive to the associated consumer, a unique ticket from a ticketinq system associated with the consumer,
going through a consumer sequencer, and
taking i) a priority service request from the priority queue or ii) a service request from said one or more buffers.

16. The method according to claim 15, further comprising:
retrieving via the thread a priority service request from the priority queue responsive to the priority queue being not empty, or
retrieving via the thread a first service request from said one or more buffers responsive to the priority queue being empty.

17. The method according to claim 15, further comprising:
checking via the thread both the consumer sequencer and the ticketing system associated with the consumer.

18. The method according to claim 17, further comprising:
returning by the thread when there is at least one associated consumer waiting for processing the set of prioritized service requests.

19. The method according to claim 11, further comprising:
maintaining the priority queue short by the thread to allow for lower complexity in performing an enqueing operation at the priority queue, and
allowing the priority queue to become empty by the thread when one or more associated consumers are waiting for processing the set of prioritized service requests, and processing by the thread the one or more service requests in a first-in first-out(FIFO) order.

20. A non-transitory machine readable storage medium having instructions stored thereon that when executed cause a system to perform steps comprising:
operate a priority queue to store a set of priority service requests and to prioritize the st of priority service requests as a set a set of prioritized service requests stored in the priority queue, wherein the set of prioritized service requests are available to an associated consumer in operative communication with the system for processing by the associated consumer;
store in one or more buffers, one or more service requests received from an associated producer in operative communication with the system; and
execute a thread to determine a lack of associated consumers waiting for processing the set of prioritized service requests, and to selectively move by the thread a service request of the one or more service requests stored in the one or more buffers to the priority queue as a priority service request exclusively in response to the determining the lack of associated consumers waiting for processing the set of prioritized service requests.

* * * * *

UNITED STATES PATENT AND TRADEMARK OFFICE
CERTIFICATE OF CORRECTION

PATENT NO. : 9,588,733 B2
APPLICATION NO. : 14/167792
DATED : March 7, 2017
INVENTOR(S) : Otenko It is certified that error appears in the above-identified patent and that said Letters Patent is hereby corrected as shown below:

In the Drawings

On sheet 4 of 7, in FIGURE 4, under Reference Numeral 401, Line 1, delete "assocaited" and insert -- associated --, therefor.

On sheet 4 of 7, in FIGURE 4, under Reference Numeral 403, Line 1, delete "idetified" and insert -- identified --, therefor.

On sheet 4 of 7, in FIGURE 4, under Reference Numeral 404, Line 1, delete "buff er" and insert -- buffer --, therefor.

On sheet 5 of 7, in FIGURE 5, under Reference Numeral 506, Line 1, delete "buff er" and insert -- buffer --, therefor.

On sheet 6 of 7, in FIGURE 6, under Reference Numeral 608, Line 1, delete "Buffe r" and insert -- Buffer --, therefor.

In the Specification

In Column 6, Line 58, after "addLoop( )" insert -- . --.

In Column 6, Line 65, delete "poll( )ethod" and insert -- poll( )method --, therefor.

In Column 7, Line 21, after "popperS.await( )" insert -- . --.

In Column 7, Line 42, delete "fro" and insert -- from --, therefor.

Signed and Sealed this
Twenty-second Day of August, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,588,733 B2

In the Claims

In Column 8, Line 57, in Claim 3, delete "ticketinq" and insert -- ticketing --, therefor.

In Column 9, Lines 25-26, in Claim 9, delete "enqueing" and insert -- enqueuing --, therefor.

In Column 9, Line 63, in Claim 13, delete "ticketinq" and insert -- ticketing --, therefor.

In Column 10, Line 12, in Claim 15, delete "ticketinq" and insert -- ticketing --, therefor.

In Column 10, Line 37, in Claim 19, delete "enqueing" and insert -- enqueuing --, therefor.

In Column 10, Line 43, in Claim 19, delete "first-out(FIFO)" and insert -- first-out (FIFO) --, therefor.

In Column 10, Line 49, in Claim 20, delete "st" and insert -- set --, therefor.

In Column 10, Line 50, in Claim 20, delete "a set a set" and insert -- a set --, therefor.